United States Patent
Lee et al.

(10) Patent No.: US 9,615,078 B2
(45) Date of Patent: Apr. 4, 2017

(54) MULTI-VIEW VIDEO ENCODING/DECODING APPARATUS AND METHOD

(75) Inventors: Jin Young Lee, Yongin-si (KR); Du Sik Park, Yongin-si (KR); Ho Cheon Wey, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 918 days.

(21) Appl. No.: 13/994,402

(22) PCT Filed: Dec. 13, 2011

(86) PCT No.: PCT/KR2011/009559
§ 371 (c)(1),
(2), (4) Date: Sep. 3, 2013

(87) PCT Pub. No.: WO2012/081877
PCT Pub. Date: Jun. 21, 2012

(65) Prior Publication Data
US 2013/0335526 A1    Dec. 19, 2013

(30) Foreign Application Priority Data

Dec. 14, 2010 (KR) .................. 10-2010-0127456
Oct. 27, 2011 (KR) .................. 10-2011-0110588

(51) Int. Cl.
*H04N 13/00* (2006.01)
*H04N 19/597* (2014.01)
(Continued)

(52) U.S. Cl.
CPC ....... *H04N 13/0048* (2013.01); *H04N 19/132* (2014.11); *H04N 19/147* (2014.11);
(Continued)

(58) Field of Classification Search
CPC .. H04N 19/176; H04N 19/597; H04N 19/147; H04N 19/61; H04N 19/132; H04N 13/0048
(Continued)

(56) References Cited

U.S. PATENT DOCUMENTS

2008/0170618 A1   7/2008  Choi et al.
2008/0273599 A1  11/2008  Park et al.
(Continued)

FOREIGN PATENT DOCUMENTS

CN    101415115 A    4/2009
CN    101601304 A   12/2009
(Continued)

OTHER PUBLICATIONS

Communication dated May 13, 2015 issued by the European Patent Office in counterpart European Patent Application No. 11847908.8.
(Continued)

*Primary Examiner* — Anner Holder
(74) *Attorney, Agent, or Firm* — Sughrue Mion, PLLC

(57) ABSTRACT

A multi-view video encoding/decoding apparatus and method are provided. The multi-view video encoding/decoding apparatus encodes the current block which is to be encoded and which belongs to a frame of a first view point, wherein the encoding is performed in accordance with a first skip mode using the frame of the first view point or a second skip mode using the frame of a second view point, thereby improving encoding efficiency.

14 Claims, 10 Drawing Sheets

(51) Int. Cl.
*H04N 19/176* (2014.01)
*H04N 19/147* (2014.01)
*H04N 19/61* (2014.01)
*H04N 19/132* (2014.01)

(52) U.S. Cl.
CPC ......... *H04N 19/176* (2014.11); *H04N 19/597* (2014.11); *H04N 19/61* (2014.11)

(58) Field of Classification Search
USPC .................................................... 375/240.01
See application file for complete search history.

(56) References Cited

U.S. PATENT DOCUMENTS

| 2009/0168874 | A1  | 7/2009  | Su et al. |
| 2009/0290643 | A1* | 11/2009 | Yang ................ H04N 19/00769 375/240.16 |
| 2010/0135391 | A1* | 6/2010  | Tian ..................... H04N 19/597 375/240.12 |

FOREIGN PATENT DOCUMENTS

| JP | 2009543508 A   | 12/2009 |
| JP | 2010516158 A   | 5/2010  |
| JP | 2010536242 A   | 11/2010 |
| WO | 2009/088195 A2 | 7/2009  |
| WO | 2009/131688 A2 | 10/2009 |
| WO | 2010/068020 A9 | 6/2010  |

OTHER PUBLICATIONS

Jacek Konieczny, et al; "Depth-Based Inter-View Prediction of Motion Vectors for Improved Multiview Video Coding"; Transmission and Display of 3D Video; Jun. 1, 2010; XP055187553; pp. 1-4.
Communicated dated Jan. 5, 2016, issued by the Japanese Patent Office in counterpart Japanese Application No. 2013-544387.
Communication dated Feb. 1, 2016, issued by the State Intellectual Property Office of People's Republic of China in counterpart Chinese Application No. 201180067556.7.
Han-Suh Koo et al., "Motion Skip Mode for MVC", Joint Video Team (JVT) of ISO/IEC MPEG & ITU-T VCEG (ISO/IEC JTC1/SC29/WG11 and ITU-T SG16 Q.6), 21th Meeting: Hangzhou, China, Oct. 23-27, 2006, Document: JVT-U091-L, Filename: JVT-U091-L.doc (7 Pages Total).
Communication dated Mar. 30, 2016, issued by the European Patent Office in counterpart European Application No. 15197392.2.
International Search Report (PCT/ISA/210) dated May 29, 2012, issued in International Application No. PCT/KR2011/009559.

* cited by examiner

MULTI-VIEW VIDEO ENCODING/DECODING APPARATUS AND METHOD

CROSS-REFERENCE TO RELATED APPLICATIONS

This application is a National State application under 35 U.S.C. §371 of PCT/KR2011/009559 filed on Dec. 13, 2011, which claims priority from Korean Patent Application No. 10-2011-0110588 filed on Oct. 27, 2011 in the Korean Patent Office, and Korean Patent Application No. 10-2010-0127456 filed on Dec. 14, 2010 in the Korean Patent Office, the disclosures of which are incorporated herein by reference.

BACKGROUND

1. Field

Exemplary embodiments relate to a multi-view video encoding and decoding apparatus and method, and more particularly to an apparatus and method for encoding and decoding an input image according to a skip mode that uses a frame of a same view or a skip mode that uses a frame of a different view with respect to a current block.

2. Description of Related Art

A stereoscopic image refers to a 3-dimensional (3D) image that simultaneously provides depth information and spatial information. Different from a stereo image that simply provides images of different views to left and right eyes of a viewer, respectively, the stereoscopic image provides different images according to a view of an observer.

Since images taken from many different views have a great amount of data, it is almost impracticable to encode the images by a single-view video coding method, such as MPEG-2 and H.264/AVC, in consideration of a network infrastructure, a terrestrial bandwidth, and the like.

Therefore, the images taken from the plurality of views need to be encoded by a multi-view video coding method. However, since the network infrastructure and terrestrial bandwidth are still limited, the multi-view video coding method needs to be improved to be more efficient.

SUMMARY

Aspects of one or more exemplary embodiments provide a current block which is encoded according to not only a skip mode based on a frame of a same view but also a skip mode based on a frame of a different view. Therefore, encoding efficiency may be increased by expanding the skip mode.

According to an aspect of an exemplary embodiment, there is provided a multi-view video encoding apparatus including an encoding mode determination unit configured to determine whether to encode a current block included in a frame of a first view according to a skip mode that uses a frame of a second view, and a bitstream generation unit configured to generate a bitstream by encoding an index indicating the skip mode when the current block is to be encoded according to the skip mode.

According to an aspect of another exemplary embodiment, there is also provided a multi-view video encoding apparatus including an encoding mode determination unit configured to determine whether to use a first skip mode using a frame of a first view or a second skip mode using a frame of a second view for encoding a current block included in the frame of the first view, and a bitstream generation unit configured to generate a bitstream by encoding an index indicating the skip mode determined with respect to the current block.

According to an aspect of another exemplary embodiment, there is provided a multi-view video decoding apparatus including an index decoding unit configured to decode an encoded index indicating a skip mode of a current block included in a frame of a first view, and a block restoration unit configured to restore the current block by extracting a prediction block of the current block in a frame of a second view according to the skip mode of the current block.

According to an aspect of another exemplary embodiment, there is also provided a multi-view video decoding apparatus including an index decoding unit configured to decode an encoded index indicating whether a current block included in a frame of a first view is encoded according to a first skip mode or a second skip mode, and a block restoration unit configured to restore the current block based on a skip mode of the current block determined by the decoded index, wherein the first skip mode determines a prediction block of the current block in the frame of the first view, and the second skip mode determines the prediction block of the current block in the frame of the second view.

According to an aspect of another exemplary embodiment, there is provided a multi-view video encoding method including determining whether to encode a current block included in a frame of a first view according to a skip mode that uses a frame of a second view, and generating a bitstream by encoding an index indicating the skip mode when the current block is to be encoded according to the skip mode.

According to an aspect of another exemplary embodiment, there is also provided a multi-view video encoding method including determining whether to use a first skip mode using a frame of a first view or a second skip mode using a frame of a second view for encoding a current block included in the frame of the first view, and generating a bitstream by encoding an index indicating the skip mode determined with respect to the current block.

According to an aspect of another exemplary embodiment, there is also provided a multi-view video decoding method including decoding an encoded index indicating a skip mode of a current block included in a frame of a first view, and restoring the current block by extracting a prediction block of the current block in a frame of a second view according to the skip mode of the current block.

According to an aspect of another exemplary embodiment, there is also provided a multi-view video decoding method including decoding an encoded index indicating whether a current block included in a frame of a first view is encoded according to a first skip mode or a second skip mode, and restoring the current block based on a skip mode of the current block determined by the decoded index, wherein the first skip mode determines a prediction block of the current block in the frame of the first view, and the second skip mode determines the prediction block of the current block in the frame of the second view.

BRIEF DESCRIPTION OF THE DRAWINGS

The above and/or other aspects will become more apparent by describing in detail certain exemplary embodiments with reference to the accompanying drawings in which.

DETAILED DESCRIPTION OF EXEMPLARY EMBODIMENTS

Figure 1:
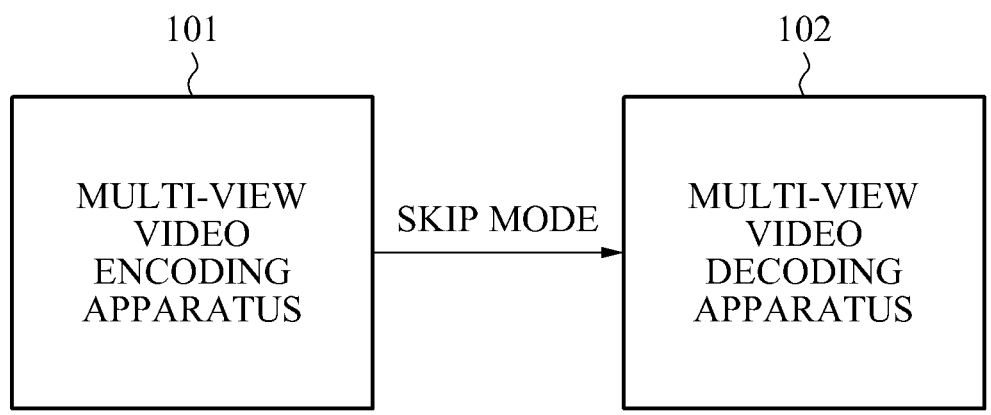
FIG. 1 is a diagram illustrating operation of a multi-view video encoding apparatus and a multi-view video decoding apparatus according to an exemplary embodiment.

Hereinafter, exemplary embodiments will be described more fully with reference to the accompanying drawings, in which like reference numerals correspond to like elements throughout.

FIG. 1 is a diagram illustrating operation of a multi-view video encoding apparatus 101 and a multi-view video decoding apparatus 102 according to an exemplary embodiment.

The multi-view video encoding apparatus 101 may efficiently encode an image in consideration of redundancy among images taken from a plurality of views. Specifically, the multi-view video encoding apparatus 101 may perform encoding according to a multi-view video encoding method. Here, the multi-view video encoding method may encode images in various encoding modes. Out of the various encoding modes, a skip mode does not encode blocks constituting an image but transmits only a 1 bit index indicating the skip mode to the multi-view video decoding apparatus 102. Therefore, encoding efficiency of the skip mode is relatively high. That is, in encoding of an image, as a number of current blocks being encoded in the skip mode increases, the encoding efficiency may be increased. Although, in general, a direct mode is distinguished from the skip mode, the skip mode according to the exemplary embodiments will be described as including the direct mode.

The multi-view video encoding apparatus 101 may separate the skip mode into a first skip mode and a second skip mode. The first skip mode encodes a current block using a frame of a same view but of a different time from a frame of the current block to be encoded. The second skip mode encodes the current block using a frame of a different view but of a same time as the frame of the current block to be encoded. Here, the first skip mode may be defined as an inter skip mode while the second skip mode may be defined as an inter view skip mode. The exemplary embodiments may include any skip mode performing the same operations and are not limited to the foregoing definitions. In the following description, a frame may be referred to as a reference image.

According to the exemplary embodiments, since a frame, not only of the same view, but also of the different view is taken into consideration, the skip mode may be applied to more current blocks being encoded.

According to the present exemplary embodiment, the multi-view video encoding apparatus 101 may encode the current block using the second skip mode. Alternatively, according to another exemplary embodiment, the multi-view video encoding apparatus 101 may determine which one of the first skip mode and the second skip mode more efficiently encodes the current block, and transmit the determined skip mode to the multi-view video decoding apparatus 102. Therefore, the multi-view video decoding apparatus 102 may decode the current block according to the transmitted skip mode.

Figure 2:
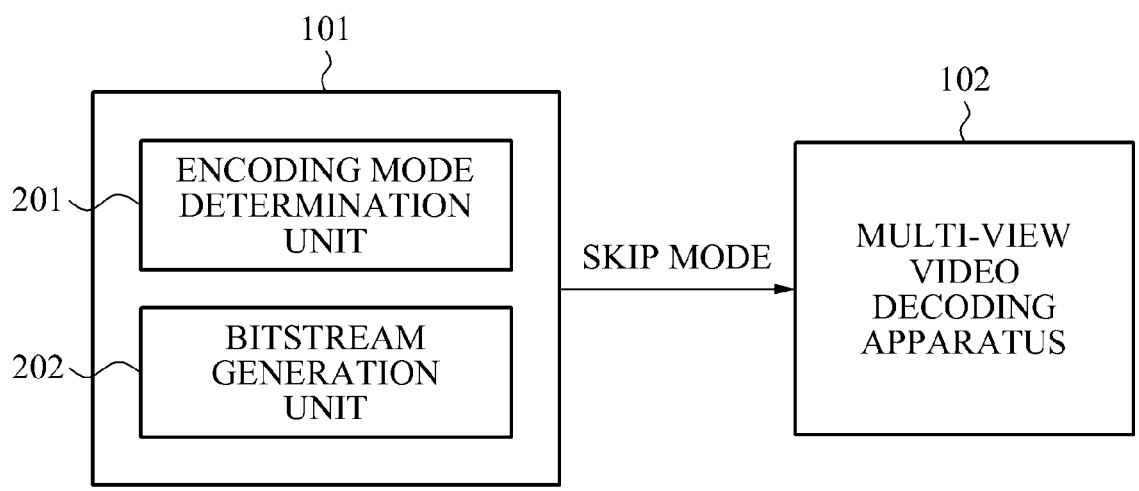
FIG. 2 is a block diagram illustrating a detailed configuration of the multi-view video encoding apparatus, according to an exemplary embodiment.

FIG. 2 is a block diagram illustrating a detailed configuration of the multi-view video encoding apparatus 101, according to an exemplary embodiment.

Referring to FIG. 2, the multi-view video encoding apparatus 101 may include an encoding mode determination unit 201 and a bitstream generation unit 202. Hereinafter, the multi-view video encoding apparatus 101 according to two exemplary embodiments will be described. Although the multi-view video encoding apparatus 101 may encode the current block according to an inter mode or an intra mode, such as inter 2N×2N, inter 2N×N, inter N×2N, inter N×N, intra 2N×2N, intra N×N, and the like, encoding according to the skip mode will be mainly described hereinafter. The encoding mode is not limited to the foregoing definition and other encoding modes may be added.

<First exemplary embodiment>

The encoding mode determination unit 201 may determine whether to use a skip mode that uses a frame of a second view for encoding the current block included in a frame of a first view. That is, the multi-view video encoding apparatus 101 may determine whether to encode the current block by the inter view skip mode. Otherwise, the encoding mode determination unit 201 may encode the current block included in the frame of the first view by an inter mode or an intra mode that uses a residual signal of the current block.

For example, when the current block is encoded according to the skip mode, a multi-view video decoding apparatus 102 may determine a prediction disparity vector (PDV) of the current block included in the frame of the first view, using a disparity vector (DV) of a peripheral block referencing the frame of the second view among peripheral blocks of the current block. Here, the PDV may be deduced by applying a median filter to a DV of at least one peripheral block. Therefore, the multi-view video decoding apparatus 102 may extract a prediction block of the current block in the frame of the second view using the PDV, and restore the current block by compensating the current block using the prediction block.

As another example, when the current block is encoded according to the skip mode, the multi-view video decoding apparatus 102 may determine the PDV of the current block, using a DV of a target block corresponding to a location of the current block in a frame of a different time from a frame including the current block among frames of the first view. Therefore, the multi-view video decoding apparatus 102 may extract the prediction block of the current block in the frame of the first view using the PDV, and restore the current block by compensating the current block using the prediction block.

As yet another example, when the current block is encoded according to the skip mode, the multi-view video decoding apparatus 102 may determine the PDV of the current block, using a DV of a target block corresponding to locations of the peripheral blocks of the current block in the frame of the different time from the frame including the current block among the frames of the first view. Therefore, the multi-view video decoding apparatus 102 may extract the prediction block of the current block in the frame of the first view using the PDV of the current block, and restore the current block by compensating the current block using the prediction block.

When the current block included in the frame of the first view is encoded according to the skip mode that uses the frame of the second view, the bitstream generation unit 202 may encode an index indicating the skip mode and generate the bitstream. For example, the index may be set to 1 when the current block is encoded according to the skip mode and to 0 when the current block is encoded not according to the skip mode. Therefore, only 1 bit is necessary in actual encoding of the index.

Different from the inter mode or the intra mode, the skip mode does not transmit the residual signal between the current block and a prediction block of the current block. Therefore, the bitstream may include an index only related to whether the current bock is encoded according the skip mode.

In addition, the peripheral blocks of the current block may include at least one block selected from a block adjoining a left side of the current block, a block adjoining an upper side of the current block, and a block adjoining an upper left end of the current block.

<Second exemplary embodiment>

Different from the first exemplary embodiment, the encoding mode determination unit 201 may determine whether to use the first skip mode that uses the frame of the first view or the second skip mode that uses the frame of the second view for encoding the current block included in the frame of the first view. For example, the encoding mode determination unit 201 may determine, as the encoding mode for encoding the current block, the skip mode having a smaller cost function among cost functions resulting from encoding according to the first skip mode and the second skip mode.

Here, the first skip mode refers to an encoding mode which determines a prediction motion vector (PMV) of the current block using a motion vector (MV) of a peripheral block referencing the frame of the first view, which indicates a different time from the frame including the current block, among the peripheral blocks of the current block, and restores the current block using the PMV. Since the second skip mode is described in detail with reference to the first exemplary embodiment, a description of the second skip mode will be omitted.

Therefore, the bitstream generation unit 202 may generate a bitstream by encoding an index indicating a skip mode determined with respect to the current block.

Figure 3:
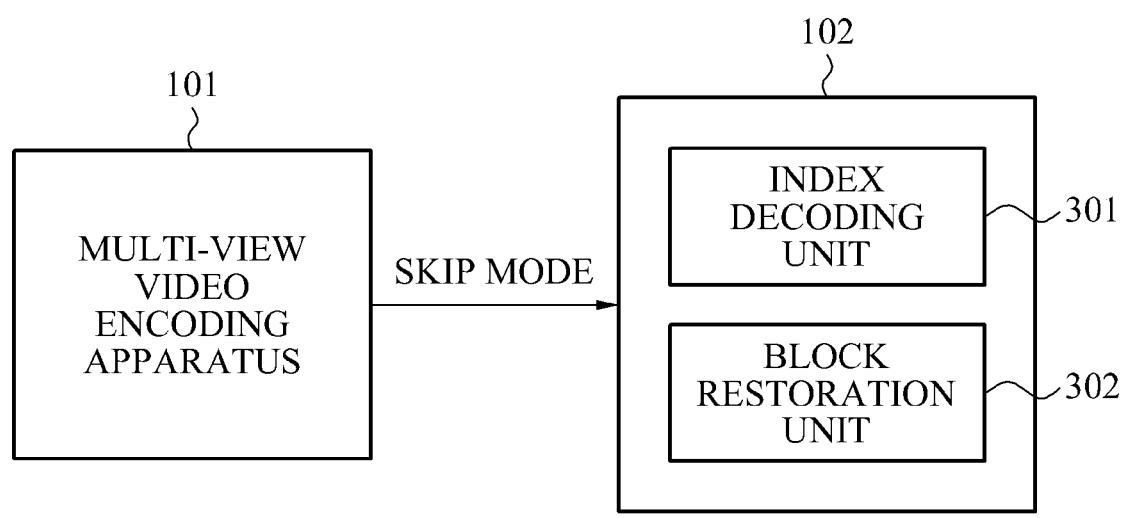
FIG. 3 is a block diagram illustrating a detailed configuration of a multi-view video decoding apparatus, according to an exemplary embodiment.

FIG. 3 is a block diagram illustrating a detailed configuration of the multi-view video decoding apparatus 102, according to an exemplary embodiment.

Referring to FIG. 3, the multi-view video decoding apparatus 102 includes an index decoding unit 301 and a block restoration unit 302. Hereinafter, the multi-view video decoding apparatus 102 according to two exemplary embodiments will be described.

<First exemplary embodiment>

The index decoding unit 301 may decode an encoded index indicating the skip mode of the current block included in the frame of the first view. The encoded index may be transmitted using the bitstream generated by the multi-view video encoding apparatus 101 and deduced from the bitstream through demultiplexing.

The block restoration unit 302 may restore the current block by extracting a prediction block of the current block in the frame of the second view according to the skip mode of the current block. For example, the block restoration unit 302 may determine a PDV of the current block using the DV of the peripheral block referencing the frame of the second view among the peripheral blocks of the current block. Additionally, the block restoration unit 302 may determine a prediction vector of the current block in the frame of the second view using the PDV, and restore the current block by compensating the current block using the prediction block.

As another example, the block restoration unit 302 may determine the PDV of the current block, using the current block of the target block corresponding to the locations of the peripheral blocks of the current block in the frame of the different time from the frame including the current block among the frames of the first view. Additionally, the block restoration unit 302 may determine the prediction vector of the current block in the frame of the second view using the PDV.

<Second exemplary embodiment>

Different from the first exemplary embodiment, the index decoding unit 301 may decode an encoded index indicating whether the current block included in the frame of the first view is encoded according to the first skip mode or the second skip mode. Here, the first skip mode may refer to an encoding mode that determines the prediction block of the current block in the frame of the first view which is the same as a view of the frame including the current block. The second skip mode may refer to an encoding mode that determines the prediction block of the current block in the frame of the second view which is different from the view of the frame including the current block.

For example, when the current block is encoded according to the first skip mode, the block restoration unit 302 may determine the PMV of the current block, using the MV of the peripheral block referencing the frame of the first view, which indicates the different time from the frame including the current block among the peripheral blocks of the current block. Therefore, the block restoration unit 302 may determine the prediction block of the current block in the frame of the first view using the PMV, and restore the current block by compensating the current block using the prediction block.

As another example, when the current block is encoded according to the second skip mode, the block restoration unit 302 may determine the PDV of the current block using the DV of the peripheral block referencing the frame of the second view among the peripheral blocks of the current block. Therefore, the block restoration unit 302 may determine the prediction block of the current block using the PDV, and restore the current block by compensating the current block using the prediction block.

As yet another example, when the current block is encoded according to the second skip mode, the restoration unit 302 may determine the PDV of the current block using the DV of the target block corresponding to the location of the current block in the frame of the first view, which indicates the different time from the frame including the current block among frames of the first view. Therefore, the block restoration unit 302 may determine the prediction block of the current block using the PDV, and restore the current block by compensating the current block using the prediction block.

Figure 4:
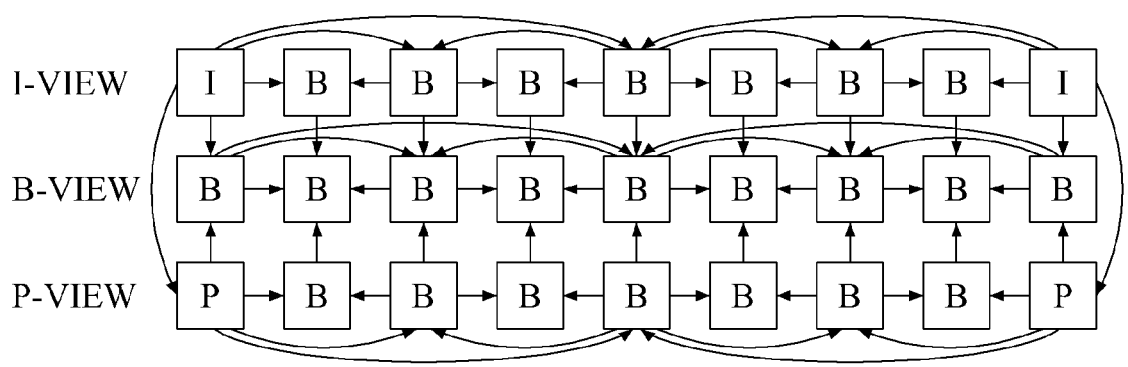
FIG. 4 is a diagram illustrating a configuration of multi-view video, according to an exemplary embodiment.

FIG. 4 is a diagram illustrating a configuration of multi-view video, according to an exemplary embodiment.

FIG. 4 shows a multi-view video encoding method which encodes input images of three views, that is, left, center, and right views, by Group of Picture (GOP). When encoding the multi-view image, the concept of hierarchical B picture is applied with respect to a temporal axis and a view axis, thereby reducing redundancy among images.

When encoding the images of the three views, the configuration of FIG. 1 may first encode the left-view image, then encode the right-view image, and then encode the center-view image (i.e., sequentially). Here, the left-view image may be encoded through motion estimation that searches for a similar area from previous images and removes temporal redundancy. When the right-view image is encoded, since the left-view image already encoded is used as a reference image, not only is the temporal redundancy removed by the motion estimation, but also inter-view redundancy generated between views may be removed through disparity estimation.

When the center-view image is encoded, both the left-view image and the right-view image may be used as reference images. Therefore, the disparity estimation may be performed in both directions, thereby removing the inter-view redundancy.

In a multi-view video encoding method as shown in FIG. 1, an I-view refers to an image encoded without using an image of another view, e.g., the left-view image). A P-view refers to an image encoded by prediction in one direction from an image of another view, e.g., the right-view image. In addition, a B-view refers to a bi-directionally predicted view image encoded in both directions from a left-view image and a right-view image, e.g., the center-view image.

Figure 5:
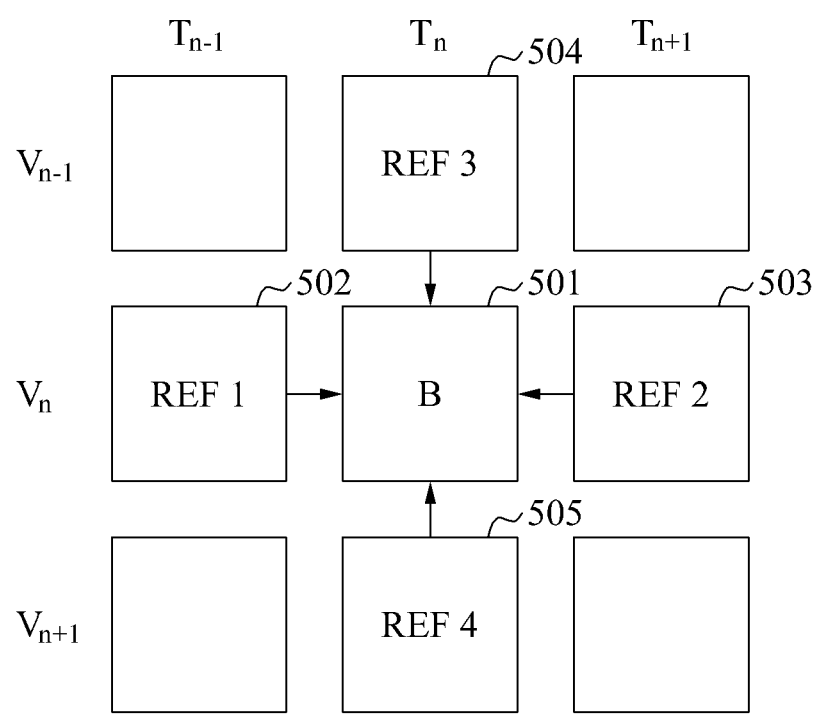
FIG. 5 is a diagram illustrating a frame used for encoding a current block, according to an exemplary embodiment.

FIG. 5 is a diagram illustrating a frame used for encoding a current block, according to an exemplary embodiment.

In general, the multi-view video encoding method may search for a prediction block most similar to the current block among peripheral blocks adjoining a current image 501 that includes the current block, and encodes a residual signal between the current block and the prediction block. However, among the various encoding modes, the encoding efficiency of the skip mode is relatively high because the skip mode does not transmit encoding information of the current block to the multi-view video decoding apparatus 102.

According to the present exemplary embodiment, the skip mode may be divided into a first skip mode that uses a frame 1 502 and a frame 2 503, of which the views are same but the times are different, and a second skip mode that uses a frame 3 504 and a frame 4 505, of which the views are different but the times are same, with respect to the current block 501.

The multi-view video encoding apparatus 101 may encode the current block according to the first skip mode. Alternatively, the multi-view video encoding apparatus 101 may encode the current block according to the second skip mode. In addition, the multi-view video encoding apparatus 101 may encode the current block according to any one of the first skip mode and the second skip mode having higher encoding efficiency. Here, the multi-view video encoding apparatus 101 may determine the encoding efficiency by calculating a cost function with respect to a result of encoding performed according to the first skip mode and the second skip mode. The cost function may be calculated by rate distortion (RD) using Equation 1.

$$RD\ Cost = SSD(s,r) + \lambda \cdot R(s,r,mode) \quad \text{[Equation 1]}$$

Here, sum of square difference (SSD) is obtained by squaring a differentiation value of a current block s and a prediction block r. $\lambda$ denotes the Lagrangian coefficient, and R denotes a number of bits necessary when encoding is performed according to the first skip mode or the second skip mode.

When the current block is encoded according to the first skip mode, the multi-view video decoding apparatus 102 may determine a PMV of the current block based on MVs of peripheral blocks using frames of the same views among the peripheral blocks of the current block. Here, the multi-view video decoding apparatus 102 may determine the PMV by applying a median filter to the MVs of the peripheral blocks. Next, the multi-view video decoding apparatus 102 may determine a prediction block of the current block in a frame of a same view as a frame including the current block, so as to restore the current block based on the PMV.

When the current block is encoded according to the second skip mode, the multi-view video decoding apparatus 102 may determine a PDV of the current block based on DVs of peripheral blocks using frames of different views among the peripheral blocks of the current block. Here, the multi-view video decoding apparatus 102 may extract the PDV by applying the median filter to the DVs of the peripheral blocks. In addition, the multi-view video decoding apparatus 102 may determine the prediction block of the current block in a frame of a different view from a frame including the current block, so as to restore the current block based on the PDV.

Accordingly, the multi-view video decoding apparatus 102 may restore the current block based on the prediction block deduced by the first skip mode and the prediction block deduced by the second skip mode.

Figure 6:
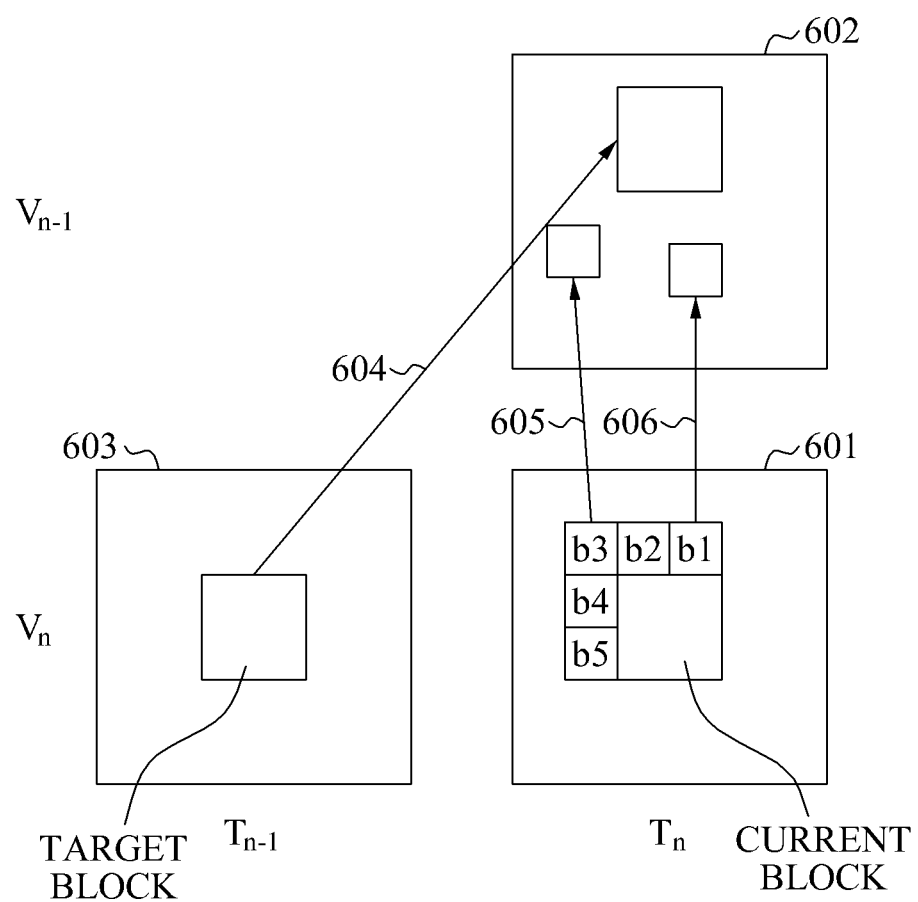
FIG. 6 is a diagram illustrating a skip mode of when a current block is encoded, according to an exemplary embodiment.

FIG. 6 is a diagram illustrating a skip mode of when a current block is encoded, according to an exemplary embodiment.

Two skip modes may be applied to encode a current block included in a frame 601. First, a first skip mode compensates the current block by extracting the prediction block from a frame 603 of a same view as a view of the frame 601. Second, a second skip mode compensates the current block by extracting the prediction block from a frame 602 of a different view from the view of the frame 601.

The first skip mode may generate a PMV by applying a median filter to an MV of peripheral blocks b1 to b5 of the current block, and determine the prediction block in the frame 603 using the PMV.

The second skip mode may generate a PDV by applying the median filter to DVs of the peripheral blocks b1 to b5 of the current block, and determine the prediction block in the frame 602 using the PDV. Also, the second skip mode may generate the PDV using a DV of a target block of the frame 603 being in a same location as the current block, and determine the prediction block in the frame 602 using the PDV. Alternatively, the second skip mode may generate the PDV by applying the median filter to the DV of peripheral blocks of the target block of the frame 603, and determine the prediction block in the frame 602 using the PDV.

Three examples of the second skip mode are suggested above. Among PDVs deduced from the three examples, a highest priority may be given to a DV indicating a most similar prediction block to the current block.

Figure 7:
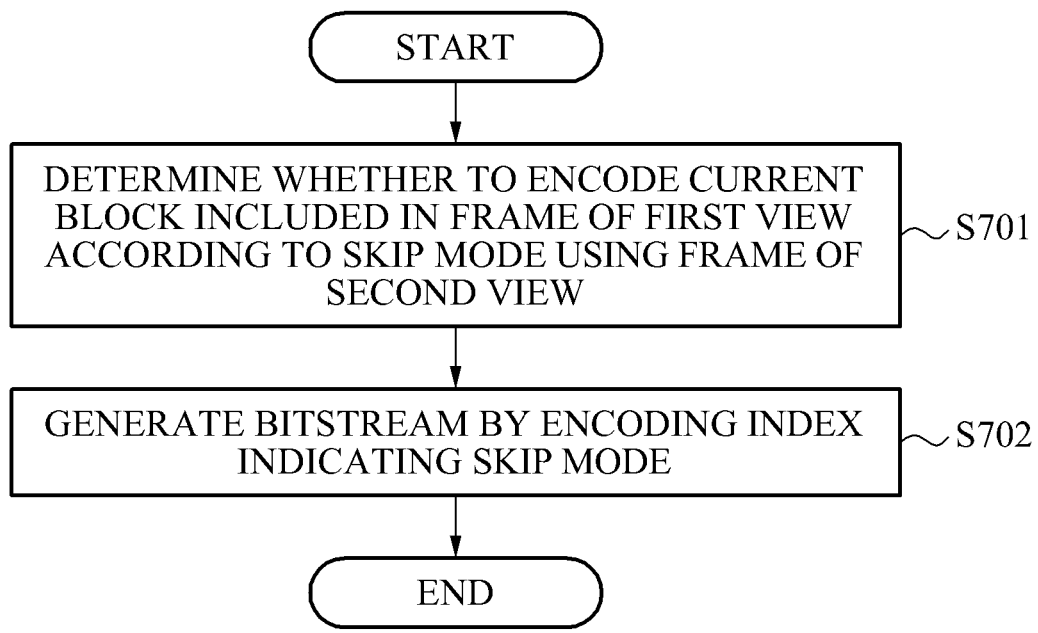
FIG. 7 is a flowchart illustrating a multi-view video encoding method according to a first exemplary embodiment.

FIG. 7 is a flowchart illustrating a multi-view video encoding method according to a first exemplary embodiment.

In operation S701, the multi-view video encoding apparatus 101 may determine whether to encode the current block included in the frame of the first view using the skip mode that uses the frame of the second view.

Here, the skip mode may refer to an encoding mode that determines the PDV of the current block using the DV of the peripheral block referencing the frame of the second view among the peripheral blocks of the current block, and restores the current block using the PDV.

Alternatively, the skip mode may refer to an encoding mode that determines the PDV of the current block using the DV of the target block corresponding to the location of the current block in the frame of the different time from the frame including the current block among the frames of the first view, and restores the current block using the PDV.

Also, the skip mode may refer to an encoding mode that determines the PDV of the current block using the DV of the target block corresponding to locations of the peripheral blocks of the current block in the frame of the different time from the frame including the current block among the frames of the first view, and restores the current block using the PDV.

In operation S702, when encoding the current block according to the skip mode, the multi-view video encoding apparatus 101 may generate a bitstream by encoding the index indicating the skip mode.

Figure 8:
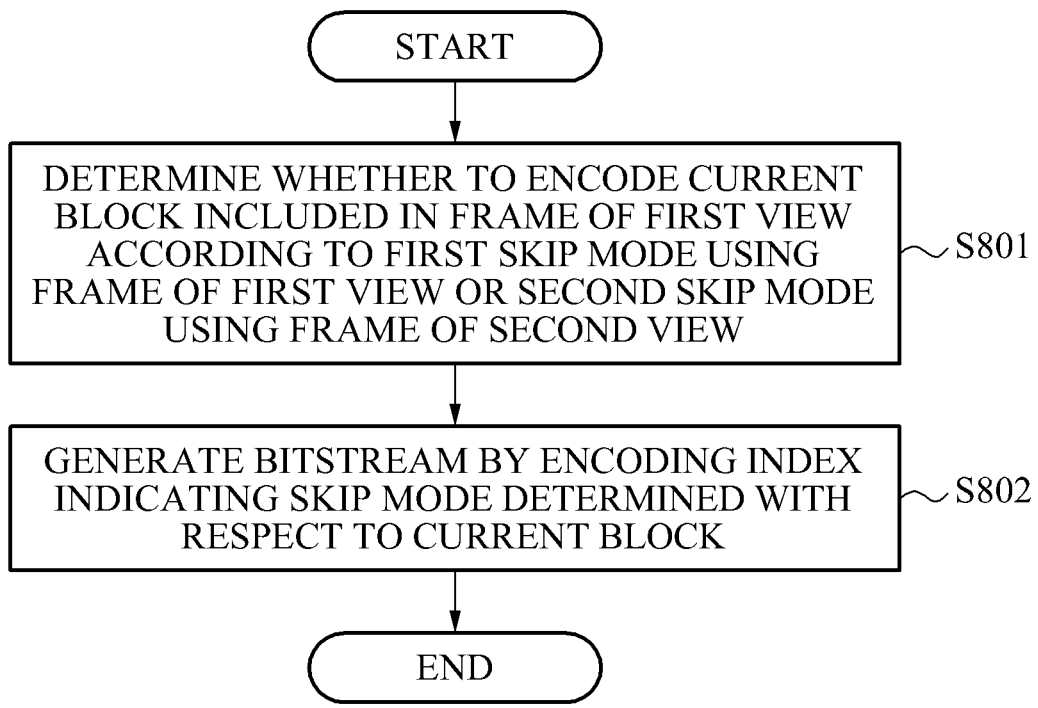
FIG. 8 is a flowchart illustrating a multi-view video encoding method according to a second exemplary embodiment.

FIG. 8 is a flowchart illustrating a multi-view video encoding method according to a second exemplary embodiment.

In operation S801, the multi-view video encoding apparatus 101 may determine whether to use the first skip mode that uses the frame of the first view or the second skip mode that uses the frame of the second view, for encoding the current block included in the frame of the first view. For example, the multi-view video encoding apparatus 101 may determine, as the encoding mode for encoding the current block, the skip mode having a smaller cost function among cost functions resulting from encoding according to the first skip mode and the second skip mode.

Here, the first skip mode may refer to an encoding mode which determines the PMV of the current block using the MV of the peripheral block referencing the frame of the first view, which indicates the different time from the frame including the current block among the peripheral blocks of the current block, and restores the current block using the PMV.

The second skip mode may refer to an encoding mode which determines the PDV of the current block using the DV of the peripheral block referencing the frame of the second view among the peripheral blocks of the current block, and restores the current block using the PDV.

In addition, the second skip mode may determine the PDV of the current block using the DV of the target block corresponding to the location of the current block in the frame of the first view, which indicates the different time from the frame including the current block, among the peripheral blocks of the current block, and restores the current block using the PDV.

In operation S802, the multi-view video encoding apparatus 101 may generate the bitstream by encoding the index indicating the skip mode determined with respect to the current block.

Figure 9:
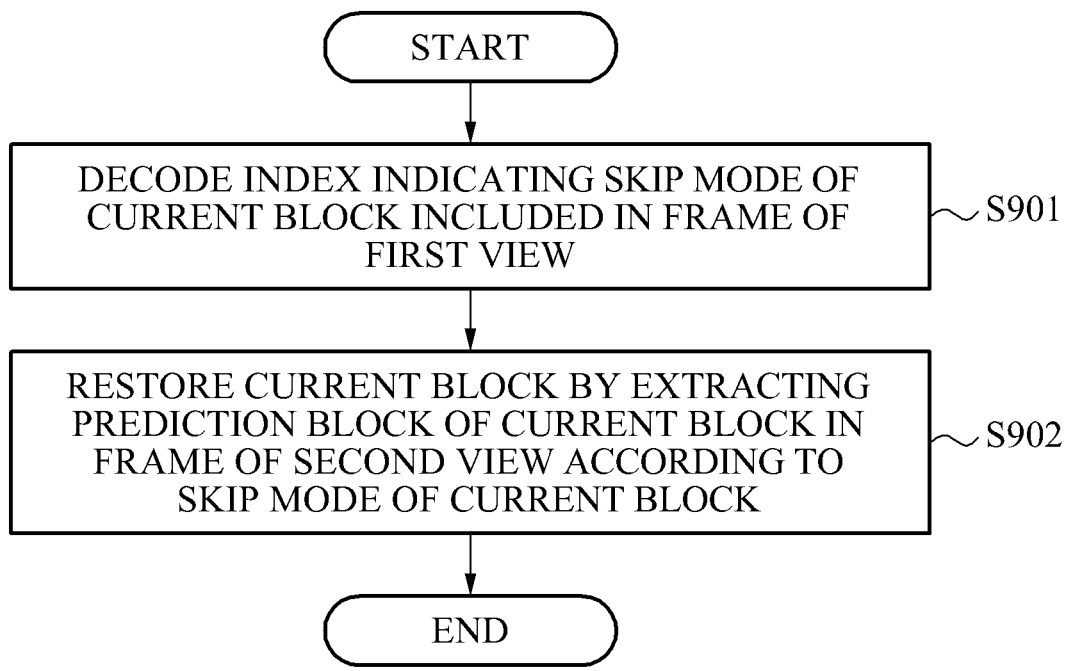
FIG. 9 is a flowchart illustrating a multi-view video decoding method according to the first exemplary embodiment.

FIG. 9 is a flowchart illustrating a multi-view video decoding method according to the first exemplary embodiment.

In operation S901, the multi-view video decoding apparatus may decode the encoded index indicating the skip mode of the current block included in the frame of the first view. The skip mode of FIG. 9 has already been described in detail with reference to FIG. 7.

In operation S902, the multi-view video decoding apparatus 102 may restore the current block by extracting the prediction block of the current block in the frame of the second view according to the skip mode of the current block.

Figure 10:
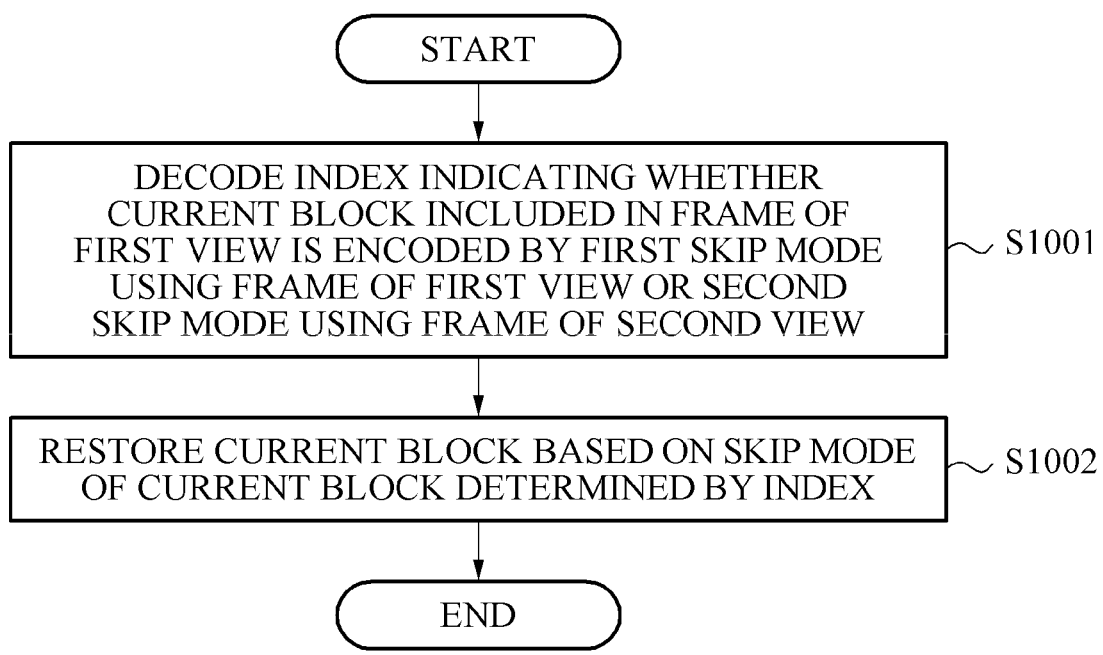
FIG. 10 is a flowchart illustrating a multi-view video decoding method according to the second exemplary embodiment.

FIG. 10 is a flowchart illustrating a multi-view video decoding method according to the second exemplary embodiment.

In operation S1001, the multi-view video decoding apparatus 102 may decode the encoded index indicating whether the current block included in the frame of the first view is encoded according to the first skip mode or the second skip mode. The skip mode of FIG. 10 has already been described in detail with reference to FIG. 8.

In operation S1002, the multi-view video decoding apparatus 102 may restore the current block based on the skip mode of the current block determined by the decoded index.

The above-described exemplary embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having ordinary skill in the art.

While certain exemplary embodiments have been particularly shown and described, it will be understood by those of ordinary skill in the art that various changes in form and details may be made therein without departing from the spirit and scope of the inventive concept as defined by the appended claims.

The invention claimed is:

1. A multi-view video encoding apparatus comprising:
   an encoding mode determination unit configured to determine an encoding mode for a current block included in a first frame view, wherein the encoding mode is a first skip mode using the first frame of the first view or a second skip mode using a second frame of a second view; and
   a bitstream generation unit configured to generate a bitstream by encoding an index indicating the skip mode determined with respect to the current block,
   wherein the encoding mode determination unit determines the encoding mode based on a first encoding result according to the first skip mode and a second encoding result according to the second skip mode.

2. The multi-view video encoding apparatus of claim 1, wherein the first skip mode determines a prediction motion vector (PMV) of the current block using a motion vector (MV) of a peripheral block referencing the first frame of the first view, which indicates a different time from the first frame including the current block, among peripheral blocks adjoining the current block, and restores the current block using the PMV.

3. The multi-view video encoding apparatus of claim 1, wherein the second skip mode determines a prediction disparity vector (PDV) of the current block using a disparity vector (DV) of a peripheral block referencing the second frame of the second view among peripheral blocks adjoining the current block, and restores the current block using the PDV.

4. The multi-view video encoding apparatus of claim 2, wherein the second skip mode determines a PDV of the current block using a DV of a target block corresponding to a location of the current block in the first frame of the first view, which indicates a different time from the first frame among frames of the first view, and restores the current block using the PDV.

5. The multi-view video encoding apparatus of claim 2, wherein the encoding mode determination unit is configured to determine a skip mode having a smallest cost function among cost functions, as the encoding mode for encoding the current block.

6. A multi-view video decoding apparatus comprising:
an index decoding unit configured to decode an encoded index indicating an encoding mode is used to encode a current block included in a first frame of a first view;
a block restoration unit configured to restore the current block based on a skip mode of the current block determined by the decoded index,
wherein the encoding mode is a first skip mode using the first frame of the first view or a second skip mode using a second frame of a second view,
wherein the encoding mode is determined based on a first encoding result according to the first skip mode and a second encoding result according to the second skip mode.

7. The multi-view video decoding apparatus of claim 6, wherein the block restoration unit is configured to determine a prediction motion vector (PMV) of the current block using a motion vector (MV) of a peripheral block referencing the first frame of the first view, which indicates a different time from the first frame, among peripheral blocks adjoining the current block when the current block is encoded according to the first skip mode, and restore the current block using the PMV.

8. The multi-view video decoding apparatus of claim 6, wherein the block restoration unit is configured to determine a prediction disparity vector (PDV) of the current block using a disparity vector (DV) of a peripheral block referencing the second frame of the second view among peripheral blocks adjoining the current block when the current block is encoded according to the second skip mode, and determine a prediction block of the current block using the PDV.

9. The multi-view video decoding apparatus of claim 6, wherein the block restoration unit is configured to determine a PDV of the current block using a DV of a target block corresponding to a location of the current block in the first frame of the first view, which indicates a different time from the first frame among frames of the first view when the current block is encoded according to the second skip mode, and determine a prediction block of the current block using the PDV.

10. A multi-view video encoding method comprising:
determining an encoding mode for a current block included in a first frame of a first view, wherein the encoding mode is a first skip mode using the first frame of the first view or a second skip mode using a second frame of a second view; and
generating a bitstream by encoding an index indicating the skip mode determined with respect to the current block,
wherein the determining comprises determining the encoding mode based on a first encoding result encoding according to the first skip mode and a second encoding result according to the second skip mode.

11. A multi-view video decoding method comprising:
decoding an encoded index indicating an encoding mode is used to encode a current block included in a first frame of a first view; and
restoring the current block based on a skip mode of the current block determined by the decoded index,
wherein the encoding mode is a first skip mode using the first frame of the first view or a
second skip mode using a second frame of a second view,
wherein the encoding mode is determined based on a first encoding result according to the first skip mode and a second encoding result according to the second skip mode.

12. A non-transitory computer-readable recording medium storing a program which, when executed by a computer, performs the method of claim 11.

13. The multi-view video encoding apparatus of claim 1, wherein, when the encoding mode is determined as the second skip mode, the bitstream generation unit encodes an index indicating the second skip mode related to the current block when the current block is included in a P-frame, and encodes an index indicating a direct skip mode included in a direct mode related to the current block when the current block is included in a B-frame.

14. The multi-view video encoding apparatus of claim 3, wherein the peripheral blocks adjoining the current block comprises at least one of a block adjoining a left side of the current block, a block adjoining an upper side of the current block, and a block adjoining an upper left end of the current block.

* * * * *